United States Patent [19]

Arthun et al.

[11] Patent Number: 4,800,023

[45] Date of Patent: Jan. 24, 1989

[54] METHOD OF ASEPTIC TREATMENT OF WATER AND A STORAGE CONTAINER TO BE USED AT SUCH TREATMENT

[75] Inventors: Nils Arthun, Partille; Peter Löfgren, Hovås, both of Sweden

[73] Assignee: Steridose Systems, Askim, Sweden

[21] Appl. No.: 9,739

[22] Filed: Feb. 2, 1987

[51] Int. Cl.⁴ .................. B01D 13/00; B01D 21/00
[52] U.S. Cl. .................. 210/644; 210/651; 210/652; 210/804; 210/805; 210/97; 210/186; 210/195.2; 210/196; 210/197; 210/257.2; 210/305; 210/321.87
[58] Field of Search ............... 210/650, 651, 652, 644, 210/804, 805, 97, 186, 197.2, 196, 197, 634, 636, 637, 641, 649, 774, 800, 803, 806, 104, 175, 181, 182, 184, 186, 194, 195.1, 195.2, 257.2, 295, 305, 321.1, 521, 522

[56] References Cited

U.S. PATENT DOCUMENTS

| | | | |
|---|---|---|---|
| 3,972,965 | 8/1976 | Higgins | 210/219 |
| 4,261,834 | 4/1981 | deWinter | 210/651 |
| 4,578,253 | 3/1986 | Gill et al. | 210/805 |

*Primary Examiner*—Frank Sever
*Attorney, Agent, or Firm*—Wegner & Bretschneider

[57] ABSTRACT

A method of aseptic treatment of water which is produced continuously or discontinuously in an amount less than any momentary and maximum output of water. Produced water is supplied to a storage container. The recirculation is carried out from the bottom of the container up to the top thereof. A fresh supply of water and recirculated water is mixed in a mixing and flow deflector member at the top part and the water mixture is spread in a thin layer along the inside of the container above a temporary water level in the container.

9 Claims, 2 Drawing Sheets

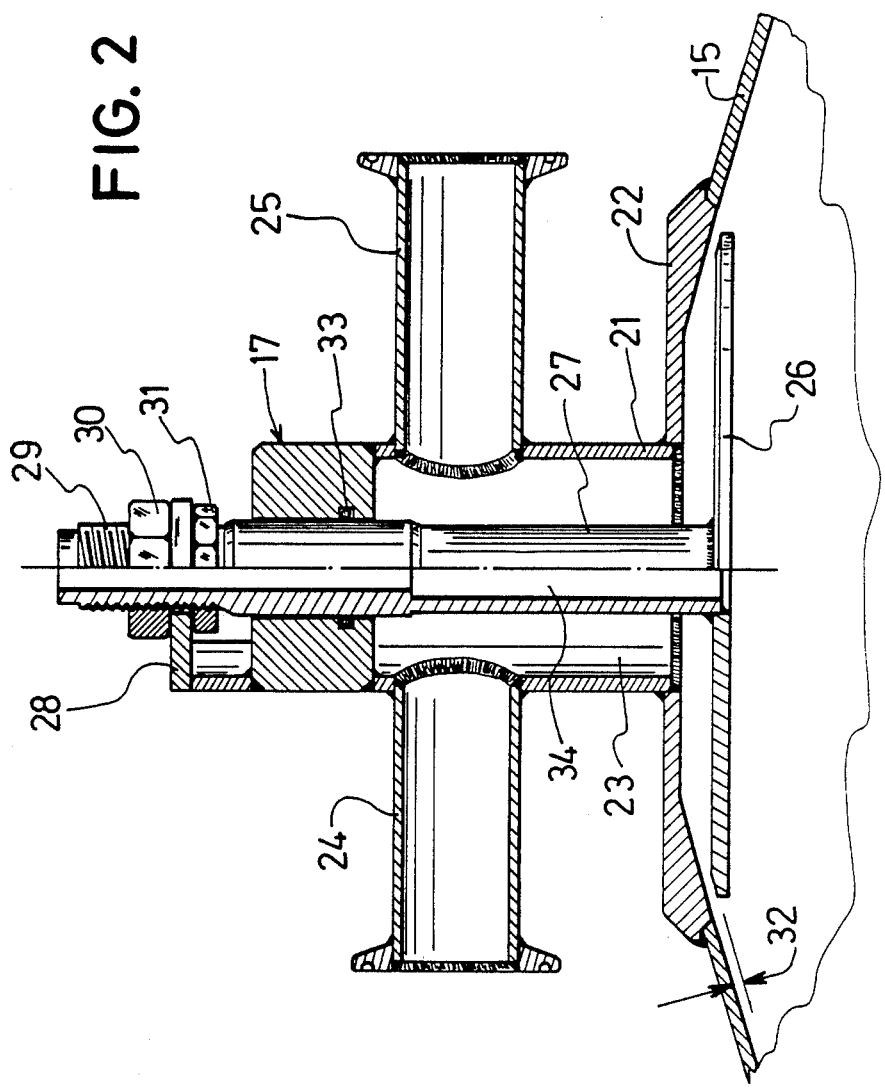

METHOD OF ASEPTIC TREATMENT OF WATER AND A STORAGE CONTAINER TO BE USED AT SUCH TREATMENT

FIELD OF THE INVENTION

Within the pharmaceutical industry, medical health care and within several other activities there are consumed large quantities of pure water of the type "water for injection" (WFI). A traditional method of manufacturing WFI water is destillation, however, such method is rather expensive and it is difficult to arrange the system for a momentary output which may be several times larger than the momentary volume produced by the destillation apparatus.

In addition there are considerable problems in storage and distribution of such water.

Regulations say that "WFI shall be stored and distributed in such a way that no foreign matters can be added to it".

Foreign matters means: "Microorganisms, pyrogenes, solid particles and other chemicals, ions in general.

BACKGROUND OF THE INVENTION

Usually, there is some sort of storage container for storing water. However, such storage implies difficulties in maintaining the water at a temperature which prevents bacterial growth - also when destilling, it is not possible to prevent completely the existence of unwanted organisms in the transport conduits and the container. It is possible to store the water at a temperature of below 8 to 10° C., or at a temperature higher than 80° C. This means however energy consumption and also environmental disturbances.

At a normal room temperature there will be a bacterial growth which might cause the formation of lipopolysacharides (pyrogenes) and such are not allowed to exist in an amount exceeding a certain limit provided the water should be used for parenteral infusion solutions. Recent reports even indicate that water used for haemodialysis should be of same standard as WFI.

SUMMARY OF THE INVENTION

The object of the present invention is to provide a method where an equipment used for continuous production of a limited amount of produced water may be used for intermittent output of relatively large volumes of WFI.

The invention provides a method of aseptic treatment of water which is produced continuously in an amount less than any intermittent output of water, where produced water is supplied to a storage container for storage and recirculation by means of a pump through a loop filter with a pore size not less than 0.2 microns.

A method according to the invention is characterized in that the recirculation is carried out from the bottom of the container up to the top thereof, that a fresh supply of water and recirculated water is mixed in a flow deflector unit at the top part, and that the water mixture is spread from a flow deflector unit in a thin layer along the inside of the top of the container and the internal side walls above a temporary water level in the container.

The invention comprises also a storage container for use with said method and which is characterized by a flow deflector unit arranged centrally in the top of the container, a supply line for produced water from the outside, a circulation conduit from the bottom of the container to the flow deflector unit, a pump and a 0.2 micron filter in said circulation conduit, and a discharge conduit downstreams the 0.2 micron filter.

The mixing and flow deflector unit preferably comprises a housing which is directly attachable to the top of the container and is provided with connection studs for the supply conduit and the circulation conduit and a plate member adjustably supported in the housing. Preferably, the flow deflector unit has axially extending through-bores and supports air pressure equalizing members at the shaft end thereof extending outside the deflector housing, said pressure equalizing members comprising a sterilizing grade filter which is active at least in the in-flow direction.

Preferably, the storage container consists of a cylindric casing having conical top and bottom parts where at least the top part completely lacks internal moisture accomodation projections and preferably has a high lustrous polish at the inside. Elements or equipment extending into the container for level sensing preferably are arranged for ultrasound sensing operation and arranged with minimum moisture trapping cavities.

A heating element preferably is arranged downstream the loop filter for intermittent sanitation of pipe conduits and the interior region of the container, and a discharge conduit is arranged from the lowest point of the bottom part.

BRIEF DESCRIPTION OF THE DRAWINGS

FIG. 2 is a partial section view of the mixing and spreading unit of the container top section.

DESCRIPTION OF A PREFERRED EMBODIMENT

Figure 1:
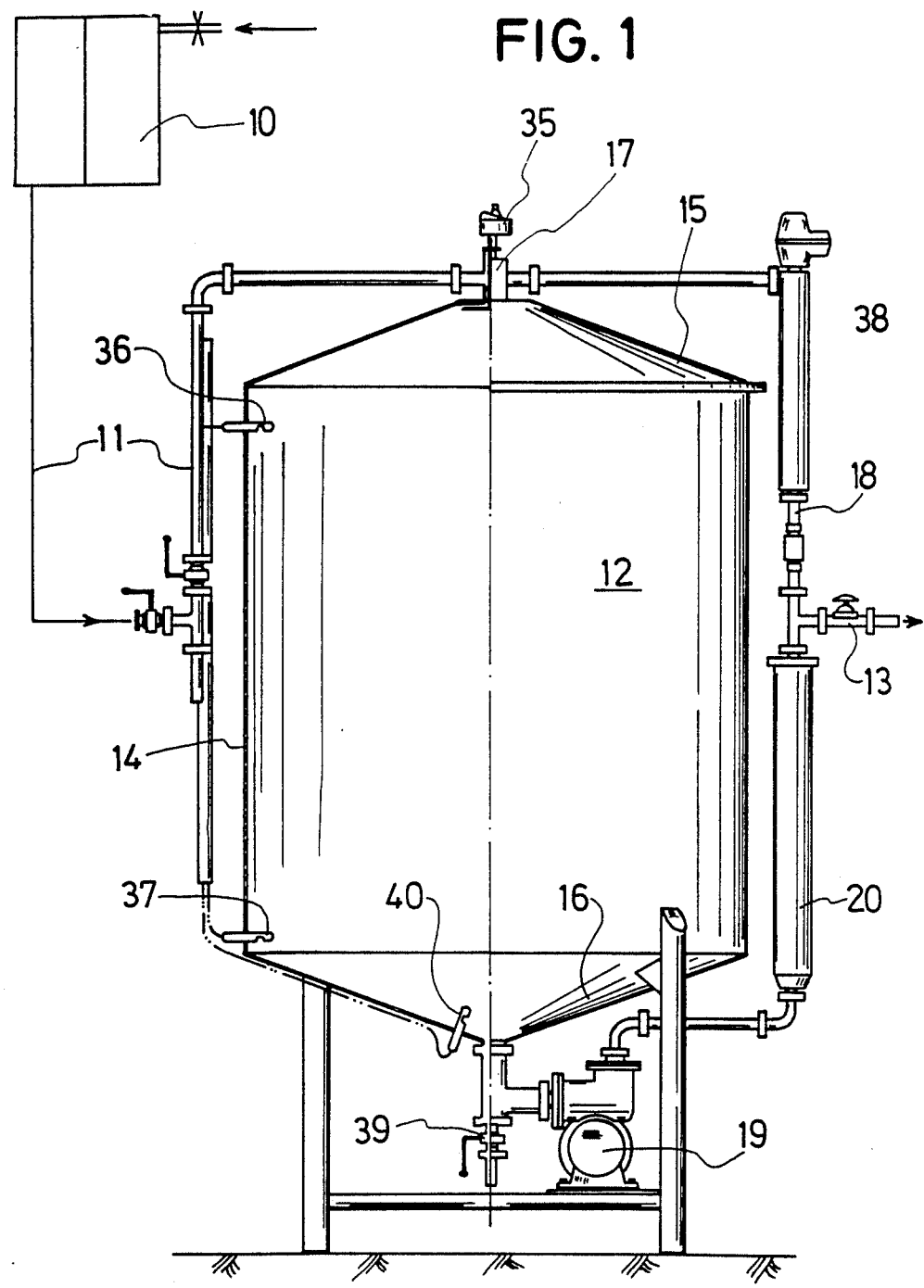
FIG. 1 shows a container system for aseptic storage of water.

The plant in FIG. 1 for aseptic storage of water comprises an apparatus 10 for continuous or discontinuous production of a certain quantity of water. The apparatus may be arranged for destillation or for so called reverse osmosis, preferably into two steps, which produces water practically free from microorganisms.

Via a conduit 11 the apparatus is connected to a storage container 12 of a suitable size for allowing a certain quantity of water to be drawn through a discharge conduit 13 (tap valve).

The problems of storing are to maintain the water under aseptic conditions from the supply moment to the discharge (draw off) time without any excessive energy consumption. An essential measure is to give the container such a shape that it practically does not leave any pockets or projecting portions where water droplets may accumulate and that the water is kept in recirculation through the loop filter continuously.

The first object is achieved by forming the container 12 with a cylindric casing 14 and conical top and bottom parts 15, 16 where the angle of the cone of the top is selected relative the spreading pressure and mass of the liquid such that the liquid will follow the inner surface of the top part down to the casing wall and such that the water flows down the wall to the temporary water level in the container without any formation of droplets. The inner surface of the container is polished to a high lustre and except for the level meter, which will be described later in the specification, there are no locations where moisture droplets may accumulate and form growing conditions for bacteria.

There is a mixing and spreading unit 17 centrally in the top part 15 of the container and this unit will be described further with reference to FIG. 2. A supply conduit 11 and a circulation conduit 18 are connected to the unit 17. The supply conduit for the distribution loop is connected to the bottom part 16 of the container and there is a pump 19 and a loop filter of known type in the conduit. The pump is of a type and is designed so that it will stand all operative temperatures continuously between 5° C. and 95° C., and the pump will further not have any rotary axes that has or might develop contact or leakage to noncontrolled surfaces or medias normally not in contact with the water that shall be recirculated, and the loop filter is of hydrophilic membrane type having a pore size not larger than 0.2 microns in order to trap all potential particles in the water and these particles might be of any kind or nature having a smallest dimension larger than the said pore size in the said loop filter.

A fresh supply of water from the conduit 11 is mixed in the unit 17 with the water that is circulated through the filter 20 and spread through the unit 17 forming a thin water layer covering the inside of the top part 15 where, as previously mentioned, it is allowed to flow downwards without anything which causes disturbance of the flow.

A continuous pumping through the loop filter guarantees that the water downstream of the said loop filter will be delivered to the loop practically free from parcticles larger than the said pore size of the loop filter and these particles might be of viable or non-viable nature, and further will all the unit surfaces in the plant have surfaces polished to such a degree and having such a shape and design that microorganisms will not be given the possibility to settle and in time multiply themselves.

The construction of the deflector unit 17 appears in detail from FIG. 2. The deflector unit comprises a housing 21 having a bottom plate 22 to be welded directly over a central opening in the top part 15. The housing surrounds a mixing chamber 23 wherein studs 24, 25 arranged for connection of conduits 11 and 18, respectively, lead.

Furtheron, in the housing there is supported a plate member 26, the shaft 27 of which passes through an opening in the ceiling of the mixing chamber 23. The ceiling supports an external bracket 29 wherein a threaded portion 29 of the shaft 27 may be fixed by two nuts 30, 31. Apparently, the axial position of the shaft 27 relative the bracket may be adjusted by means of said nuts for defining the spreading slot 32 between the circumference of the plate 26 and the opposite portion of the housing 22 of the unit. An efficient seal between the shaft and the valve housing is obtained by one or several O-ring seals 33.

During filling and discharge of water, respectively, it is necessary for the container to "breath". Therefore, the shaft of the plate member has an axial through-bore in the form of a passage 34 which is connected to members 35 (FIG. 1) that contain a sterilizing grade filter, at least in a direction inwards, for filtering the flow of air.

Of course, it is necessary to have a certain control of the liquid level in the container, and in said container there is a level sensing member 36 that senses the highest water level and a level member 37 that senses the lowest water level. Said members control the primary production apparatus 10 which continuously or discontinuously produce water controlled by the member 36. The function of the member 37 is an alarm function and the member gives a signal when the apparatus 10 does not operate as expected or if the discharge through the conduit 13 has been too large. Both members are mounted in the wall of the casing such that the top part is integral.

The essential point is that said members, which are the only ones that project into the container, are formed such that any accomodation of moisture is prevented.

Level sensors are therefore arranged for operating according to the ultra sound method or by other nonmoving items which means that there will not be pockets of the type obtained by traditional level sensors, and additionally moisture will flow quickly away from elements that are indispensible within the container.

In order to guarantee an operation under aseptic conditions without having to open the container for cleaning or sanitation, the container is equipped with a heating element 38 in the circulation conduit 18 between the loop filter 20 and the unit 17. Sanitation on a routine basis, say twice a week, means that water is discharged approximately to a lowest level at the member 37 and that thereafter, during a certain period of time, the rest of the water is pumped through the loop filter 20 and the heater 38 such that a temperature of around 90° C. will be maintained. This means an efficient killing of viable organisms trapped on the membrane filter surface. The water used for heat sanitation is discharged to drain.

A discharge valve 39 is arranged at the lowest point in the bottom part and a third level sensor 40 controls the circulation pump such that it will not operate in a dry state. Possibly, thereafter a new rinsing operation with freshly produced water is carried out before the plant is operated again.

The embodiment described above and shown on the drawing is just an example, the details of which may be varied within the scope of the accompanying claims and with due consideration of local conditions and the quality need for the water.

We claim:

1. A method, comprising providing effective short term aseptic storage and treatment of water at a temperature as low as ambient, where produced water is supplied to a storage container and water is recirculated by means of a pump through a loop filter, including the steps of:

recirculating water from the bottom of the container up to the top part thereof, mixing a fresh supply of water and recirculated water in a mixing and deflector member at the top part, and spreading the water mixture from said member in a thin layer along the inside of the top part of the container and the internal side walls above a temporary water level in the container.

2. A storage container comprising: an apparatus for providing effective short term aseptic storage and treatment of water at a temperature as low as ambient, provided with an inlet and an outlet, including, a cylindrical casing having a conical top and bottom parts connected thereto, wherein at least said top conical part lacks internal moisture accumulation projections, a mixing and spreading unit arranged centrally at the top part of the container, a connection conduit connected to the unit and arranged for supplying produced water from the outside of the container, a circulation conduit from the bottom of the container to a pump and a loop filter in said circulation conduit, and a discharge conduit downstream of the loop filter.

3. A storage container as in claim 2, wherein the mixing and spreading unit comprises a housing which is directly connectable to the top part of the container and supports connection studs for a supply conduit and a circulation conduit and a plate member having an adjustable slot.

4. A storage container as in claim 3, wherein the plate member has an axial through-bore and supports air pressure equalizing members at the shaft end thereof outside the valve housing, said air pressure equalizing members comprising a sterilizing grade filter operative at least at an inward flow.

5. A storage container as in claim 4, wherein the container has a high lustre polish at the inside thereof.

6. A storage container as in claim 5, wherein parts of a level sensor extend into the container area and are arranged for ultra sound sensing or by other means measures the water level and have reduced moisture trapping surfaces.

7. A storage container as in claim 6, wherein a heating element is placed downstream the loop filter for intermittently heating the container at the interior thereof, and the wet surfaces in the system and a discharge conduit is arranged from the lowest point of the bottom part.

8. A method, comprising providing effective short term aseptic storage and treatment of water for injection at a temperature as low as ambient, where produced water is supplied to a storage container and water is recirculated by means of a pump through a loop filter, including the steps of:

recirculating water from the bottom of the container up to the top part thereof, mixing a fresh supply of water and recirculated water in a mixing and deflector member at the top part, and spreading the water mixture from said member in a thin layer along the inside of the top part of the container and the internal side walls above a temporary water level in the container.

9. A storage container comprising: an apparatus for providing effective short term aseptic storage and treatment of water for injection at a temperature as low as ambient, provided with an inlet and an outlet, including, a cylindrical casing having a conical top and bottom parts connected thereto, wherein at least said top conical part lacks internal moisture accumulation projections, a mixing and spreading unit arranged centrally at the top part of the container, a connection conduit connected to the unit and arranged for supplying produced water from the outside of the container, a circulation conduit from the bottom of the container to a pump and a loop filter in said circulation conduit, and a discharge conduit downstream of the loop filter.

* * * * *